United States Patent [19]

Kunz

[11] Patent Number: 5,501,504
[45] Date of Patent: Mar. 26, 1996

[54] MOTOR HOME CONSTRUCTION

[75] Inventor: James R. Kunz, Riverside, Calif.

[73] Assignee: Fleetwood Enterprises Inc., Riverside, Calif.

[21] Appl. No.: 270,141

[22] Filed: Jul. 1, 1994

[51] Int. Cl.$^6$ ........................................ B60P 3/32
[52] U.S. Cl. .................. 296/164; 296/204; 296/37.1; 296/37.6; 280/783; 280/790
[58] Field of Search .................... 296/156, 164, 296/204, 37.1, 37.6, 182; 280/783, 790

[56] References Cited

U.S. PATENT DOCUMENTS

| Re. 17,209 | 2/1929 | Oechsle . | |
|---|---|---|---|
| 1,411,875 | 4/1922 | Schroeder | 280/783 |
| 1,422,034 | 7/1922 | Collier | 280/790 |
| 1,475,328 | 11/1923 | Wales | 280/783 |
| 1,540,914 | 6/1925 | Wallace | 296/182 |
| 2,639,187 | 5/1953 | Grumbache | 296/37.6 |
| 2,741,492 | 4/1956 | McCaw | 280/781 |
| 3,080,021 | 3/1963 | Muir | 296/182 |
| 3,134,603 | 5/1964 | Rodgers | 296/37.1 |
| 3,713,662 | 1/1973 | Abromavage et al. | 280/783 |
| 3,872,637 | 3/1975 | Murphy | 296/204 |
| 3,989,119 | 11/1976 | Cady | 296/204 |
| 4,049,312 | 9/1977 | Rudbeck | 296/37.14 |
| 4,127,300 | 11/1978 | Melley et al. | 296/204 |
| 4,159,844 | 7/1979 | Weiner | 296/37.1 |
| 4,728,144 | 3/1988 | Crean | 296/37.14 |
| 4,746,164 | 5/1988 | Crean | 296/37.14 |
| 4,907,735 | 3/1990 | Ushioda et al. | 280/790 |
| 5,054,843 | 10/1991 | Gray | 296/181 |
| 5,112,082 | 5/1992 | Clelland | 280/783 |
| 5,342,106 | 8/1994 | Fischer | 296/164 |

FOREIGN PATENT DOCUMENTS

| 662142 | 8/1929 | France | 280/790 |
|---|---|---|---|
| 438052 | 11/1967 | Switzerland | 296/37.1 |
| 556075 | 5/1977 | U.S.S.R. | 296/204 |
| 992295 | 2/1983 | U.S.S.R. | 280/790 |
| 2257397 | 1/1993 | United Kingdom | 296/204 |

Primary Examiner—Dennis H. Pedder
Attorney, Agent, or Firm—Price, Gess, & Ubell

[57] ABSTRACT

The present invention pertains to the construction of new and improved motor homes and, more particularly, to the construction of a superstructure platform and the mounting of the platform on a unit chassis. In addition to improving the stability of the vehicle, the present invention also provides rigidity in the motor home, as well as storage space for goods that is easily accessible from the outside of the motor home.

23 Claims, 2 Drawing Sheets

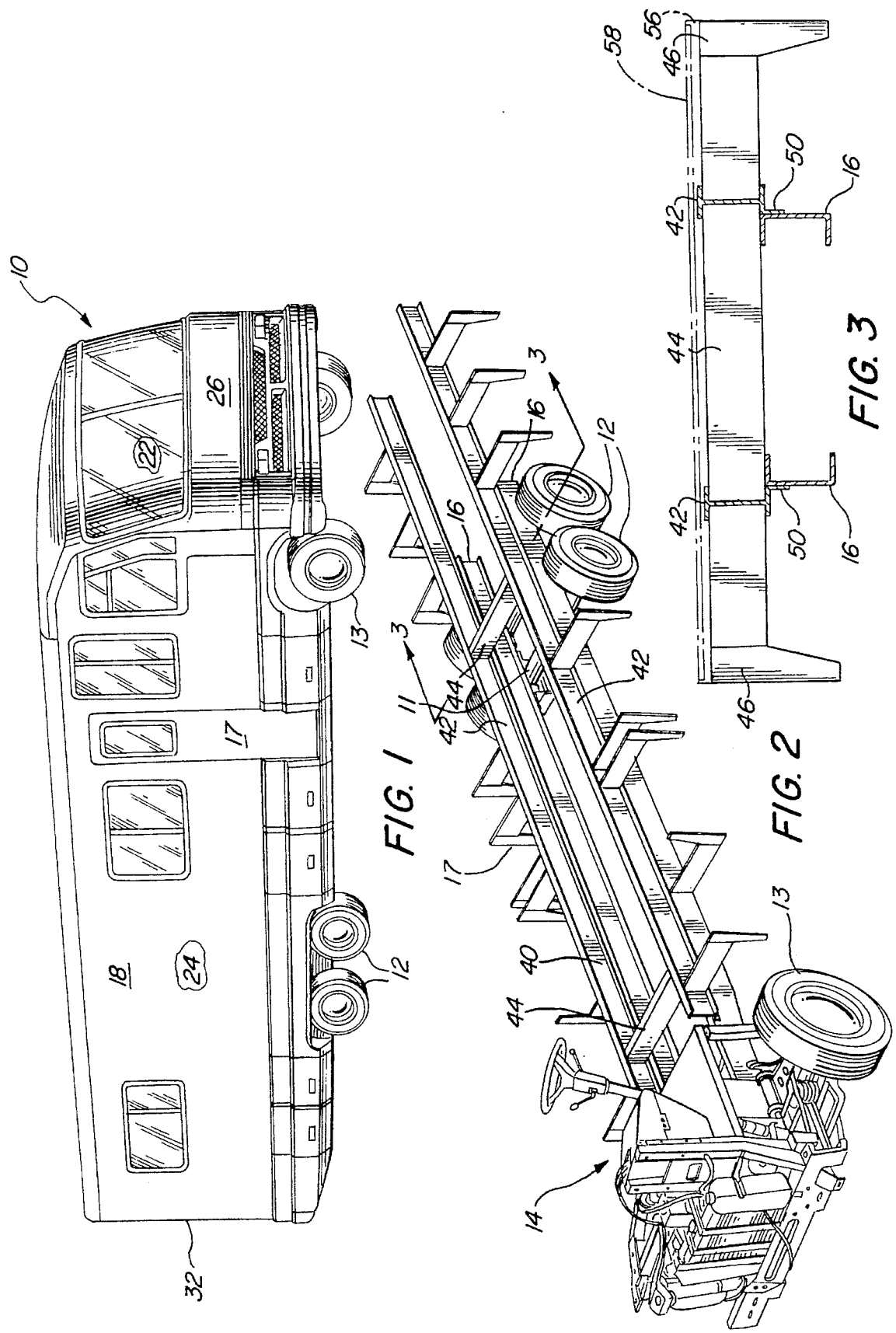

MOTOR HOME CONSTRUCTION

BACKGROUND OF THE INVENTION

1. Field of the Invention

The present invention set forth in this specification pertains to the construction of new and improved motor homes and, more particularly, to the construction of a superstructure platform and the mounting of the platform on a unit chassis. In addition to improving the stability of the vehicle, the present invention also provides rigidity in the motor home, as well as storage space for goods that is easily accessible from the outside of the motor home.

2. Description of Related Art

The term "motor home" is commonly utilized to designate a motor vehicle capable of being utilized as a place of residence. Motor homes are constructed in a variety of sizes and shapes. Motor homes are commonly constructed with conventional motor vehicle parts and components.

Motor homes are normally built on a "chassis" of a motor vehicle. The motor vehicle industry produces various trucklike chassis on which various manufacturers build shell-type enclosures containing simulations of home-living components. These motor homes are powered by a variety of engines located in the front, the rear, or midway in the chassis. As used in this specification, the term "chassis" is employed to designate all of the mechanical components of a motor home produced by the motor vehicle industry. Thus, a "chassis" includes various mechanical components such as the motor, front and rear axles, control pedals, steering wheel and the like, as well as the chassis frame upon which these and other items are mounted. Conventional wheels are attached to the front and rear axles to support the chassis frame. Most commonly, the chassis frame includes two somewhat parallel elongated members which extend between the front and rear ends of the chassis. The chassis frame is normally utilized for the purpose of directly or indirectly supporting the vehicle shell.

As used herein, the term "shell" generally refers to and includes a frame-like structure, including a floor which extends over the chassis in order to surround the usable space within a motor home. The shell is typically supported by the chassis, and encloses both the forward portion of the chassis where various operating controls for the vehicle are located, and the living area which extends from the front portion towards the rear of the vehicle.

As described above, the chassis frame includes two parallel elongated members which extend between the front and rear ends of the chassis, commonly referred to as chassis rails. These chassis rails are normally constructed of steel beams having a channel-shaped cross-section. The chassis rails are spaced apart, with the length of the rails being dependent upon the variations in the wheel bases of different motor vehicles.

Since the floor of the motor home shell is generally built upon the chassis, it is desirable to have the chassis be flat and straight. However, because of the manner in which a vehicle chassis is normally constructed, the twin rails are not sturdy and are subject to bending and twisting moments. For example, the weight of an engine and transmission mounted to the rails at the rear of the vehicle can cause the rails to bow, resulting in the midportion of the chassis rails being up to 1½ inches higher than the rear portion of the rail. Still further, while being shipped the chassis is often secured to its transport by chains. This manner of securing the chassis often results in the chassis rails being nonplanar, bent, or deformed en route to their destination. As a result, it is not always possible to construct the floor of the motor home shell upon a chassis that is be flat and straight.

Since the shell of the motor home is generally built upon the chassis, it is desirable to have the chassis provide support to the shell. However, as described above, the vehicle chassis rails are not sufficiently sturdy and are further subject to bending and twisting moments from dynamic forces. For example, while the motor home is being driven on the highway, the chassis flexes due to a number of dynamic forces imparted by the various road conditions, especially during cornering or when the motor home is rounding a curve. In an attempt to minimize the dynamic forces acting on the frame, the prior art relies upon a number of compensating devices. These devices include gas pressure shocks, high density bushings, and sway bars to help the vehicle maintain stability and stick to the road, especially during cornering. These devices, however, never fully compensate for the dynamic forces, but instead add more complexity to the vehicle and more mechanisms to maintain. Further, these devices add additional weight to the motor home, both reducing gas milage and reducing the weight which could be otherwise allocated to other more useful items to the motor home's inhabitants.

Still further, the inadequacy of the chassis frame to provide support to the shell often results in the bending and twisting moments being transferred from the chassis to the shell. As a result of this flexing, the sidewalls of a motor home often develop cracks and fractures. In an attempt to minimize the dynamic forces acting on the shell, the prior art relies upon a number of undesirable compensating methods. One method is simply to add extra material to the walls. For example, a solid lattice of tubing and sheet metal can be added. This additional material, however, does not solve the problems which cause the cracking and, instead, simply adds additional weight to the motor home, thus further reducing the weight which could be allocated to other useful items in the motor home. In some instances, this additional weight, added at some distance from the center of gravity of the vehicle, further compounds the poor road handling characteristics described above.

One further disadvantage of current construction of motor home structures is that they often fail to provide adequate, accessible storage space. The lack of storage space results from the current method of construction of motor homes in which the shell floor is mounted directly upon the vehicle chassis. It is desirable to provide space for the storage of the miscellaneous personal goods, such as luggage, tools, fishing rods, folding chairs and so on. Further, it is especially important to provide storage space for various tanks or vessels (fuel, water, LPG) as are needed in connection with the operation of a motor home. Current construction methods provide only limited solutions to the problems of where to position and how to mount these various different vessels and, in particular, where to position such vessels to achieve a satisfactory weight distribution, while maintaining accessibility for easy service.

SUMMARY OF THE INVENTION

It is apparent from the foregoing that there is a need for a new and improved motor home and, more specifically, for a motor home which overcomes the problems associated with a flimsy frame, different floor levels, and the problems of providing both easily-accessible space for various vessels and storage for personal goods in a motor home. The present invention satisfies the needs set forth in the preceding discussion. It further provides for ease of construction of a new and improved superstructure platform and the mounting of the platform on a unit chassis. In addition, the platform improves the stability of the vehicle by lowering the center of gravity and increasing longitudinal stiffness of the chassis. In addition to increased stability, the platform further provides rigidity in the motor home and increased storage for goods or luggage, such storage space being easily accessible from the outside of the motor home. The present invention further provides a motor home which may be easily and conveniently manufactured at a comparatively nominal cost and which may be satisfactorily utilized with little or no difficulty.

One significant advantage of the present invention is that it achieves an improvement over current motor homes because the platform provides a flat, smooth, and horizontal surface on which to construct the floor of the motor home. This is true regardless of the minor twists and bends in the underlying vehicle chassis rails caused by chaining during transport or due to engine loading. As a result of the platform being constructed separately and then attached to the frame, the platform of the present invention provides a surface on which to construct a motor home shell which is superior over the prior art.

Another significant advantage of the present invention is that it provides a frame for motor home construction which achieves superior rigidity over the prior art. As a result, the vehicle chassis is made sturdy and is able to tolerate and withstand the bending and twisting dynamic forces while the motor home is being driven on the highway. The structural flexing in the chassis is reduced, and improvements are achieved in road handling characteristics, especially during cornering. As a result, the need for expensive and complex compensating devices is reduced.

Still further, the increased rigidity of the chassis frame now provides support to the shell. The shell is thus subjected to reduced bending and twisting. As a result, a reduction in sidewall cracking and fracturing is achieved, without any additions of undesirable weight to the shell walls and without further compounding the road handling characteristics described above.

Another advantage of the construction of the present invention is that the floor of the motor home is lifted to the level of the floor of the driver's compartment. This results in the interior of a motor home being constructed with a single floor level, resulting in increased usable space.

One final advantage of the construction of the present invention is the provision of adequate, accessible storage space. Since the shell floor is now mounted directly upon the platform and not upon the vehicle chassis, additional storage space for the various tanks or vessels is provided between the motor home floor and the chassis. Further, easily accessible space for storage of miscellaneous personal goods and items of occupants of the motor home is provided along the sides of the motor home.

An additional unique feature to the storage compartments of the present invention is pass-through storage capability. In the prior art each storage compartment was self-contained with a bulkhead behind the wall of each respective storage container. As a result, the walls of the storage container defined the entire usable space in the storage container. In the present invention, because the storage containers are affixed to outriggers instead of to bulkheads, interconnected storage space is achieved across two or three storage bins, allowing for longitudinal storage of extremely long items (up to 144 inches) such as beach umbrellas or fishing poles. For additional storage space, apertures may be cut into the platform beam members to allow further storage of extremely long items transverse to the platform beams. This is advantageous, since these items with the present invention can be stored under the motor home and not inside the living area or tied to the outside shell as previously required.

The particular motor home illustrated in the drawings utilizes the concepts of this invention as are defined in the appended claims. Those skilled in the field of the construction and design of motor homes will realize that these operative concepts may be easily employed in motor homes which differ significantly in appearance or construction from the motor home illustrated through the use and exercise of routine engineering skill in the noted field. Further, other objects and merits and a fuller understanding of the present invention will be obtained by those having ordinary skill in the art when the following detailed description of the preferred embodiment is read in conjunction with the accompanying drawings. Therefore, the accompanying drawings are not to be considered as limiting this invention.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a side elevational view of the presently preferred embodiment of a motor home including a shell in accordance with this invention;

FIG. 2 is a perspective view of the presently preferred embodiment of a motor home chassis with the shell removed, and including a platform in accordance with this invention;

FIG. 3 is a partial cross-sectional view taken at line 3—3 of FIG. 2 in order to clearly illustrate the construction involved.

DETAILED DESCRIPTION OF THE PREFERRED EMBODIMENTS

Figure 4:
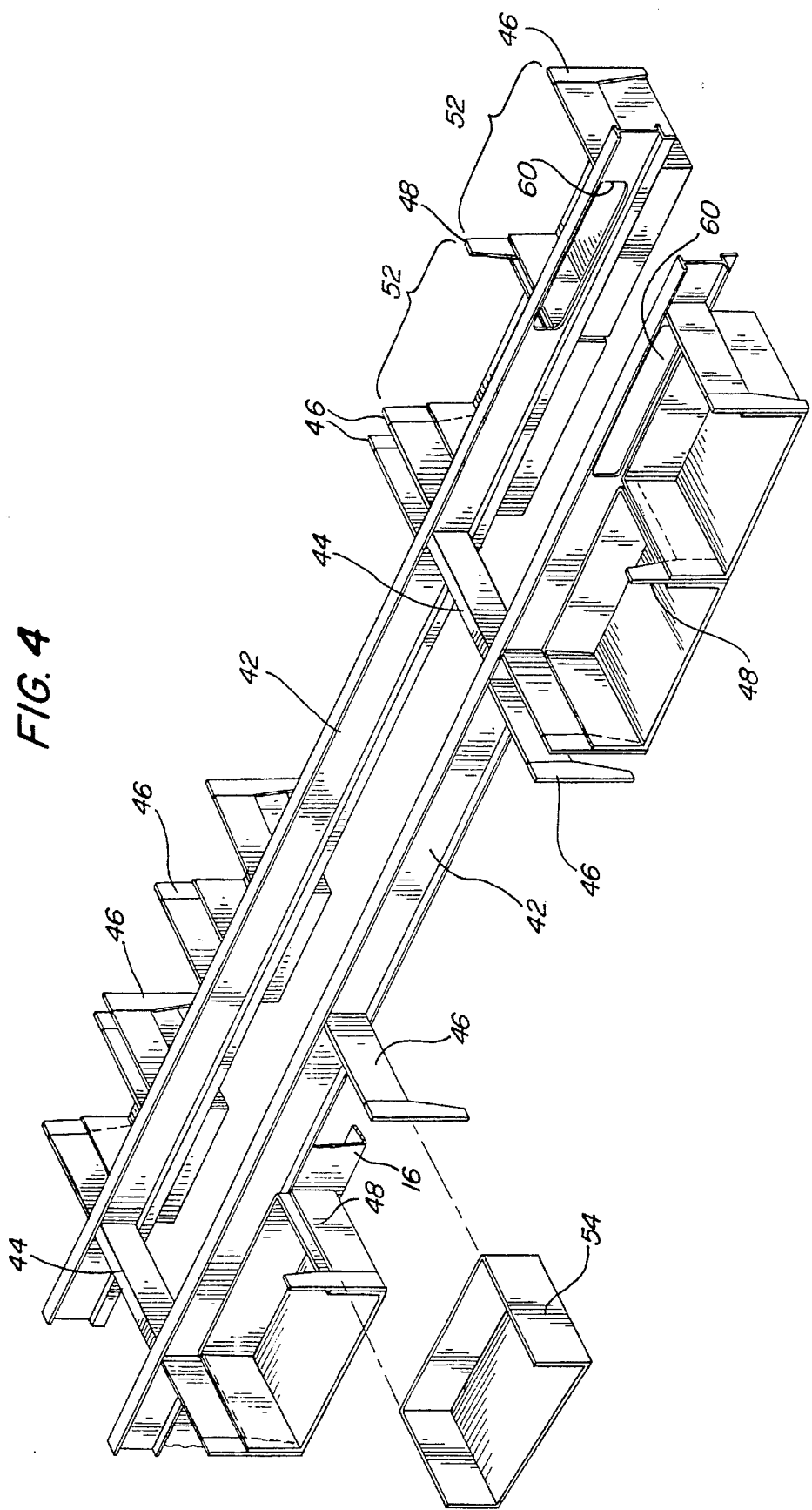
FIG. 4 is a perspective view of the presently preferred embodiment of the platform with storage containers in accordance with this invention.

The following description is provided to enable any person skilled in the art to make and use the invention and sets forth the best modes contemplated by the inventor of carrying out his invention. Various modifications, however, will remain readily apparent to those skilled in the art.

Referring now to the drawings, in FIG. 1 there is shown a motor home 10 in accordance with this invention which utilizes conventional wheels 12 to support a conventional chassis (not shown) and a motor home shell 18. FIG. 2 illustrates the motor home chassis 14 with the shell 18 removed, including the chassis rails 16, which form a part of the chassis 14 which supports the shell 18 of the motor home 10. FIG. 2 further includes a platform 40 in accordance with this invention. It is not necessary to completely illustrate the chassis frame 14, the chassis rails 16, or the motor home shell 18 since these items are well known in the automotive and motor home industry.

The motor home 10 includes a shell 18 located above the chassis 14 so as to enclose the complete interior of the motor home 10. The shell 18 is indirectly supported by the chassis 14 as is conventional in the industry and as subsequently indicated in this specification. The interior area enclosed by the shell 18 consists of two separate parts: a driver's compartment 22 and a living area 24. The driver's compartment 22 is located immediately adjacent to the front end 26 of the motor home 10. The living area 24 extends from immediately behind of the driver's compartment 22 to the rear end 32 of the motor home 10.

The chassis frame 14 supports the vehicle shell 18. The chassis frame 14 includes two, parallel elongated members which extend between the front and rear ends of the chassis frame, commonly referred to as chassis rails 16. The chassis rails 16 are normally constructed of steel beams having a channel-shaped cross-section, the channel having opposed sidewalls of equal height. The chassis rails 16 are spaced apart, having channels facing inwardly, with the length of the rails being dependent upon the variations in the wheel bases of different motor vehicles. The structural improvement of the platform 40 of the present invention is mounted to the chassis rails 16 once it has been constructed.

Referring to FIG. 3, the structural improvement is constructed of a pair of longitudinally-extending beam members, hereafter platform beams 42, connected to and spaced apart by at least two transversely-extending cross-beam members 44. The cross-beam members 44 and the platform beams 42 lie in a common horizontal plane. The crossbeams 44 are rigidly interconnected at their ends to the platform beams 42 and may be fastened together in a variety of ways, such as rivets, bolts, or preferably welding. A suitably rigid frame can be attained with only two cross-members. However, if weight is of little concern and a more rigid platform 40 is desired, additional cross-members may be added. The spacing of the cross-beam members 44 can be varied depending upon the desired location of various tanks or vessels (fuel, water, LPG). In a preferred embodiment, the cross-beam members 44 are located such that when the platform 40 is mounted on the chassis 14 a first cross-member 44 is placed toward the forward end of the chassis and a second cross-member 44 is placed in the area over the rear axles 11 of the chassis 14.

In a preferred embodiment, the platform beams 42 and the cross-beam members 44 are formed of a plurality of vertically-oriented steel beams having an "I" shaped cross-section. A standard "I" beam has two parallel channels facing opposite each other. The first channel is defined by a base and spaced-apart parallel sidewalls extending from the opposite edges of the base and normal thereto. The second channel, facing opposite from the first channel, is defined by a base formed by the base of the first channel and by a pair of spaced-apart parallel sidewalls extending from the opposite edges of the base and normal thereto. Together, the adjacent sidewalls form flanges which extend perpendicular to the central vertical surface of the beam. In the most preferred embodiment, both the platform beams 42 and the cross-beam members 44 are formed of "PACO CORRUGATED" I-beams as described in U.S. Pat. No. 4,251,973 to Young J. Paik.

Outrigger members 46, 48 are substantially L-shaped and extend horizontally away from the platform 40. The upper outrigger members 46 are connected to the platform rails 42. The upper outriggers 46 are oriented such that each extends horizontally away from the platform rail 42, generally parallel to one another, with the base of the L-shaped member extending downwardly to form a support arm. The lower outrigger members 48 are connected to the chassis rails 16. The lower outriggers 48 are oriented such that each extends horizontally away from the chassis rails 16, generally parallel to one another and the upper outriggers 46, with the base of the L-shaped member extending upwardly to form a support arm. Outrigger members 46, 48 may be cut from or formed of pieces of sheet metal welded together. In the preferred embodiment, the outriggers 46, 48 are formed from a single piece of stamped steel.

The outrigger members 46, 48 are preferably rigidly interconnected to the platform beams 42 and chassis rails 16 respectively, and may be fastened together in a variety of ways, such as rivets, bolts, or preferably welding. The upper outriggers 46 are connected such that they are substantially coplanar with the upper surface of the adjacent platform rail 42. Although alternative embodiments may utilize only upper outrigger members or only lower outrigger members, the preferred embodiment utilizes a combination of both upper and lower outrigger members to maximize storage space.

The spaces 52 created between the extending outriggers 46, 48 afford a storage area. The storage area becomes an improved storage compartment when storage bins 54 are affixed to the support arms of the outriggers 46, 48. Each storage bin 54 is of generally elongated rectangular box configuration and open at its outside end for placement and removal of miscellaneous equipment and tools. The bins 54 can be secured to the outriggers by any suitable fastener used to secure the various parts described to one another. In the preferred embodiment, threaded fasteners are used to secure the bin edges to the outriggers 46, 48 and platform beams 42. When lower outriggers 48 are used in between adjacent storage bins 54, an additional unique feature of interconnected storage space is achieved. As a result, pass-through storage capability is made available for extremely long storage items such as beach umbrellas or fishing poles to be stored across the two or three storage bins 54. For additional storage space, apertures 60 may be cut into the platform beam members 42 to allow further storage of extremely long items transverse to the platform beams 42.

Inasmuch as the wheels 12 normally extend somewhat above the chassis frame 16, no outriggers are located in the general vicinity of the wheels 12, so as provide room to accommodate the wheels 12. Flat plates may be superposed over the vehicle wheels 12 to form wheel wells. The plates are substantially coplanar with the upper surfaces of the platform beams 42, cross-beams 44, and the upper surfaces of the outriggers 46, 48. In the preferred embodiment, the outriggers 46, 48 are located a distance adjacent to each side of the wheels 12 to form wheel wells, together with the motor home floor.

The outriggers 46, 48 are spaced so as to provide a series of spaces which are substantially uniform in cross-sectional configuration, which facilitates the insertion of a predesigned modular storage bin 54. In a preferred embodiment, the first outrigger 46 is located 36 inches behind the axle of the front wheel 13. In a motor home 10 having a length of 208 inches between the front wheel 13 and the forward rear wheel 12, there is sufficient length to insert three storage bins 54 with a 48-inch width and still provide space for the rear wheel well. If the motor home 10 had a length of 228 inches between the front wheel 13 and the forward rear wheel 12, there is sufficient length to insert three storage bins 54 of 48-inch width, and additional container of 20-inch width. If the vehicle were shorter, having a length of 178 inches between the front wheel 13 and the forward rear wheel 12, there is sufficient length to insert two storage bins 54 of 48-inch width, and an additional container of 18-inch width. Because of the flexibility in the location of the outriggers 46, 48, every motor home chassis available on the market can be fitted utilizing a combination of only four widths of storage bins.

This flexibility in locating the outriggers 46, 48 is further advantageous since the doorway 17 to the living area can be located in at least three locations on the right side of the motor home 10. Again, because of the flexibility in locating the outriggers 46, 48, every motor home chassis available on the market can be fitted by utilizing a combination of only four widths of storage bin 54.

FIG. 4 illustrates the manner in which the platform 40 is mounted to the chassis rails 16, and the manner in which the platform beams 42, the outriggers 46, and the cross-beams 44 support the motor home floor 58. As described above, the preferred embodiment of the platform rails 42 utilizes an I-beam with two parallel channels facing opposite of each other. The first channel is defined by a base and spaced-apart parallel sidewalls extending from the opposite edges of the base and normal thereto. A flat elongate member, preferably made of steel, is affixed, preferably welded, to the inside edge of the I-beam sidewall to form a leg 50, extending away from the channel and normal to the sidewall.

The platform 40 is then lifted onto the chassis 14, and the platform rails 42 are positioned so as to be spaced from, yet generally parallel to, the chassis rails 16. The platform is then measured to assure that it is horizontal to the ground without regard to whether or not the chassis rails 16 are nonplanar, bent, or twisted. If desired, wood blocks may be inserted between the chassis 14 and the wheel axle 11 such that the chassis 14 are directly supported by the axle 11. In effect, the use of blocks removes any variation between the leaf springs which support and space the chassis 14 from the axle 11. At this point, the leg 50 is affixed to the chassis rails 16, thus providing a flat planar, straight, and level surface upon which to construct the motor home floor 58. The leg 50 may be affixed to the chassis rails 16 in a variety of ways, such as rivets, bolts, or preferably welding. If wooden blocks were used, they are removed, thus allowing the platform and chassis 14 to be entirely supported by the leaf springs.

In the preferred embodiment, a thin neoprene pad 56 is positioned over the members of the platform, the platform beams 42, the outriggers 46, and the cross-beams 44. The pad 56 acts to isolate the aluminum motor home floor 58 from the various steel members of the platform, thus dampening road noise and vibration. The motor home floor 58 can be secured to the platform beams 42, the outriggers 46, and the cross-beams 44 by any of the various and suitable fasteners well-known to secure the various parts described to one another.

Conventional doors, well known in the art, are located adjacent to the storage bins 54 so as to provide access to these spaces. These doors can be mounted through the use of conventional hinges and can be secured in place by conventional latches. The doors normally will correspond to the dimensions of the spaces so as to permit easy accessibility. The storage bin 54 can further be used to store equipment (water and LPG tanks, generators, etc.) utilized in the use or operation of the motor home 10. These vessels can be dimensioned and located as desired by a manufacturer in accordance with the interior structure of the motor home so as to be accessible and to properly "balance" the weight of the completed motor home 10. Because this equipment is connected in a conventional manner, no effort has been made to illustrate the lines and the like used to connect such equipment to various operative parts of the motor home 10. Further, it is considered to be within routine skill in the art to determine the proper locations as reasonably necessary within the chassis 14 of the complete motor home 10.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. In a motor home including a chassis frame, the chassis frame having front and rear ends, sides extending between the ends and including a pair of spaced longitudinal chassis frame rails, extending generally between the ends and supported by a rear axle with wheels, the structural improvement comprising:

a pair of longitudinally-extending beam members forming a set of longitudinal platform rail members, the longitudinal platform rail members positioned substantially above and generally parallel to and rigidly interconnected with the chassis frame rails and extending from substantially in advance of the axle to the end of the chassis frame rails;

a plurality of transversely-extending cross-beam members, the cross-beam members connected to each of the longitudinal platform rail members and lying above the chassis frame rails;

a plurality of lower outrigger supports cantilevered and secured to the chassis frame rails and extending generally parallel to one another from the chassis frame rails;

a plurality of upper outrigger supports cantilevered and secured to at least one of the longitudinal platform rail members and extending from the rail member generally parallel to the other upper outrigger supports, the upper outrigger supports being secured such that an upper surface of each upper outrigger support is substantially coplanar with an upper surface of the adjacent longitudinal platform rail; and at least one storage bin positioned between adjacent extending outrigger supports, the bin being generally box-shaped and having at least one open side, the bin being secured to the adjacent outrigger supports to form a storage compartment.

2. The motor home of claim 1 wherein the longitudinal platform rail members extend beyond the end of the chassis frame rails.

3. The motor home of claim 1 wherein a plurality of the outrigger supports are mounted opposite of each other.

4. The motor home of claim 1 wherein a transversely-extending cross-beam member is positioned in the area over the rear axle of the chassis.

5. The motor home of claim 1 wherein a first transversely-extending cross-beam member is positioned in the area over the rear axle of the chassis, and a second transversely-extending cross-beam member is positioned toward the forward end of the chassis.

6. The motor home of claim 1 wherein a plurality of storage compartments are interconnected to increase the entire usable storage space, allowing the storage of elongate items across a plurality of storage compartments.

7. The motor home of claim 1 further comprising a door means for enclosing a storage compartment, the door means providing access to the storage compartment from the exterior of the motor home.

8. The motor home of claim 1 wherein the longitudinal platform rail members have a cross-sectional I-shape.

9. The motor home of claim 8 wherein the chassis frame rails have a cross-sectional U-shape and a lower flange of the longitudinal platform rail member is approximately coplanar with an upper flange of the chassis frame rail.

10. The motor home of claim 1 wherein the upper outrigger supports have a substantially L-configuration.

11. The motor home of claim 10 wherein an outer leg of the L-configuration extends downward and parallel to a side of the chassis frame rails.

12. The motor home of claim 11 wherein the lower outrigger supports have a substantially L-configuration.

13. The motor home of claim 12 wherein an outer leg of the L-configuration of the lower outrigger support extends upward and parallel to a side of the longitudinal platform rail members.

14. The motor home of claim 1 further including an elongated aperture located in each of the platform rail members to enable a common space to extend between outrigger supports.

15. The motor home of claim 14 wherein a storage compartment is positioned adjacent each elongated aperture to permit the storage of elongated items between storage compartments.

16. A motor home comprising:
   a chassis frame, the chassis frame having front and rear ends, sides extending between the ends, a pair of spaced longitudinal rails, extending generally between the ends and supported by a rear axle with wheels,
   a housing structure which extends over the chassis in order to surround the usable space within a motor home,
   a driver's compartment floor located in the housing structure on the chassis frame adjacent to the front end of the chassis frame,
   a pair of longitudinally-extending beam members forming a set of platform rails, the platform rail members positioned generally parallel to and rigidly interconnected with the chassis rails and extending from substantially in advance of the axle to the end of the chassis frame rails, the platform rail members having a cross-sectional I-shape;
   a plurality of transversely-extending cross-beam members, the cross-beam members connected to the longitudinal platform rail members and having a height that is substantially the same as the platform rail members;
   a plurality of outrigger supports secured to at least one of the platform rail members and extending from the rail member generally parallel to each other the outrigger supports being secured such that the upper surfaces of the outrigger supports are substantially coplanar with the upper surface of the adjacent rail member;
   a motor home floor extending generally from the rear of the driver's compartment floor to the rear of the chassis, the floor supported and positioned by the platform rails, cross-beam members and the outrigger supports and;
   at least one storage bin positioned between adjacent extending outrigger supports, the bin being generally box-shaped and having at least one open side, the bin being secured to the outrigger supports to form a storage compartment.

17. The motor home of claim 16 wherein the longitudinal platform rail members extend beyond the end of the chassis rails.

18. The motor home of claim 16 wherein the longitudinal platform rail members substantially extend above each of the chassis frame rails.

19. The motor home of claim 16 wherein a plurality of the outrigger supports are mounted opposite of each other.

20. The motor home of claim 16 wherein a transversely-extending cross-beam member is positioned in the area over the rear axle of the chassis.

21. The motor home of claim 16 wherein a first transversely-extending cross-beam member is positioned in the area over the rear axle of the chassis, and a second transversely-extending cross-beam member is positioned toward the forward end of the chassis.

22. The motor home of claim 16 wherein a plurality of storage compartments are interconnected to increase the entire usable storage space, allowing the storage of elongate items across a plurality of storage compartments.

23. The motor home of claim 16 further comprising a door means for enclosing a storage compartment, the door means providing access to the storage compartment from the exterior of the motor home.

* * * * *